US012629237B2

(12) United States Patent
Chen

(10) Patent No.: US 12,629,237 B2
(45) Date of Patent: May 19, 2026

(54) FLOSS ACCESSORY AND METHOD

(71) Applicant: Lin-Hao Chen, Oradell, NJ (US)

(72) Inventor: Lin-Hao Chen, Oradell, NJ (US)

( * ) Notice: Subject to any disclaimer, the term of this patent is extended or adjusted under 35 U.S.C. 154(b) by 346 days.

(21) Appl. No.: 17/357,009

(22) Filed: Jun. 24, 2021

(65) Prior Publication Data

US 2021/0401555 A1 Dec. 30, 2021

Related U.S. Application Data

(60) Provisional application No. 63/046,118, filed on Jun. 30, 2020.

(51) Int. Cl.
*A61C 15/04* (2006.01)

(52) U.S. Cl.
CPC .................................. *A61C 15/046* (2013.01)

(58) Field of Classification Search
CPC ......... A61C 15/00; A61C 15/02; A61C 15/04;
A61C 15/042; A61C 15/047; A61C
15/046; A61C 15/048
USPC ................................ 132/323, 324, 325, 326
See application file for complete search history.

(56) References Cited

U.S. PATENT DOCUMENTS

| | | | |
|---|---|---|---|
| 3,848,613 A | 11/1974 | Sheehan | |
| 4,094,328 A | 6/1978 | Ray | |
| 4,508,125 A | 4/1985 | Loubier | |
| 4,655,234 A | 4/1987 | Bowden | |

| | | | | | |
|---|---|---|---|---|---|
| 5,287,865 A | * | 2/1994 | Fulton | .................. | A61C 15/046 |
| | | | | | 132/325 |
| 5,301,699 A | | 4/1994 | Craft | | |
| 5,375,614 A | | 12/1994 | Navratil | | |
| 5,657,780 A | * | 8/1997 | Giacopuzzi | .......... | A61C 15/046 |
| | | | | | 132/325 |
| 5,881,744 A | * | 3/1999 | Lo | ......................... | A61C 15/046 |
| | | | | | 132/325 |
| 6,092,536 A | * | 7/2000 | Owens | ................. | A61C 15/046 |
| | | | | | 132/324 |
| 7,467,631 B2 | * | 12/2008 | Bergman | ............. | A61C 15/046 |
| | | | | | 132/325 |
| 9,517,118 B1 | * | 12/2016 | Borg | ..................... | A61C 15/046 |
| 2002/0185149 A1 | * | 12/2002 | Ali | ........................ | A61C 15/046 |
| | | | | | 132/324 |
| 2004/0244814 A1 | * | 12/2004 | Prineppi | ............. | A61C 15/047 |
| | | | | | 132/325 |

(Continued)

*Primary Examiner* — Rachel R Steitz
*Assistant Examiner* — Karim Asqiriba
(74) *Attorney, Agent, or Firm* — Scott H. Kaliko, Esq; Ellenoff Grossman & Schole, LLP

(57) ABSTRACT

An apparatus for holding dental floss in tension, comprises of two components that form two sets of pivoted arms that holds the floss in tension between them; a means that host a repository of floss, such as a spool for example; and a means to anchor the dental floss that also hosts a sharp object to sever the excessive floss segment. Angular movement happens when the said two pivoted components move close to and away from each other. The said angular movement is then transformed to the horizontal sliding movement of a separate module which in turn locks the said repository of the spool, stopping it from dispensing more floss; changes the overall body length of the said apparatus; and drive a means which anchor and grip tight the floss. Together the locked repository, gripping anchor, and changing of the device length tighten the floss being held between the said two sets of the pivoted arms.

18 Claims, 13 Drawing Sheets

(56) References Cited

U.S. PATENT DOCUMENTS

| | | | | |
|---|---|---|---|---|
| 2004/0244815 A1* | 12/2004 | Lee | .................. | A61C 15/043 |
| | | | | 132/323 |
| 2005/0252520 A1* | 11/2005 | Filsouf | ............... | A61C 15/046 |
| | | | | 132/235 |
| 2006/0011212 A1* | 1/2006 | Achepohl | ........... | A61C 15/046 |
| | | | | 132/325 |
| 2007/0204879 A1* | 9/2007 | Chen | .................. | A61C 15/046 |
| | | | | 132/325 |
| 2009/0301514 A1* | 12/2009 | Passafaro | ............ | A61C 15/046 |
| | | | | 132/326 |
| 2011/0073131 A1* | 3/2011 | Hsu | .................. | A61C 15/046 |
| | | | | 132/323 |
| 2012/0042897 A1* | 2/2012 | Raybould | ........... | A61C 15/046 |
| | | | | 132/327 |
| 2016/0310246 A1* | 10/2016 | Borg | ................. | A61C 15/046 |
| 2018/0140397 A1* | 5/2018 | Kozak | ............... | A61C 15/045 |

* cited by examiner

H-c

A-c

FLOSS ACCESSORY AND METHOD

BACKGROUND OF THE INVENTION

1. Field of the Invention

The present invention relates to apparatus and methods for handling dental floss.

2. Description of Related Art

The importance of dental floss has been described and emphasized for almost, if not over, half of a century. However, US News on May 2, 2016 reported that, only just little over 32 percent of people floss daily.

The main reason for such low usage of floss can be attributed to two factors:

1. No effective and easy-to-use floss holder is available to facilitate flossing.

2. Applying floss directly with bare hands is painfully inconvenient.

Various devices have been proposed for dispensing floss and holding it in position appropriate for insertion between teeth. See for example, U.S. Pat. Nos. 3,484,613; 4,094,328; 4,508,125; 4,655,234; 5,287,865; 5,375,614; 5,301,699; 6,092,536; and 7,467,631.

SUMMARY OF THE INVENTION

In accordance with the illustrative embodiments demonstrating features and advantages of the present invention, there is provided a floss accessory for dispensing floss. The accessory including a housing for holding a supply of the loss. The accessory also including a pair of pivotally mounted holders arranged to swing together and hold a portion of the floss.

In accordance with another aspect of the invention there is provided a floss accessory for dispensing floss. The accessory including a housing for holding a supply of the loss. The accessory also including a pair of pivotally mounted holders arranged to swing together and hold a portion of the floss. At least one of the holders being linked to the housing to prevent dispensing of the floss in response to the pair of holders swinging together.

The apparatus disclosed here in this document solves such obstacles by allowing users to handle floss in only one single move to achieve pulling floss out of a repository, tightening the floss to provide sufficient tension, and cutting off the used segment of the floss, making floss application simple and effective, and thus increasing the usage of floss in order to improve the gum health of the general population.

A feature of the present invention is the way angular movement between two components is transferred to dynamically move the grip and tighten the floss; as well as strategically positioning a blade for easy severing of the floss.

In a disclosed embodiment a housing can hold a spool of floss. A support frame runs substantially the length of the accessory and has one end slidably mounted in the housing. An exposed (distal) end of the disclosed frame has a claw-like shape comprising a pair of prongs, the ends of each having a transverse holding notch. Pivotally mounted on the frame is an articulating holder. An exposed (distal) end of the disclosed articulating holder has a claw-like shape comprising a pair of prongs, the ends of each having a transverse holding notch. The frame and articulating holder are herein referred to as a pair of holders.

In this embodiment, the articulating holder and the frame can come together so that each prong of the disclosed articulating holder can move alongside a corresponding one of the prongs of the frame. For example, the right (left) branch of the articulating holder will move alongside the right (left) branch of the frame. In this position the notches of the articulating holder are in registry with corresponding notches of the frame. Branches that have moved alongside each other are shown herein with notches that open in opposite directions, that is, one notch opens up and the other down.

Each of the disclosed notches open in a direction facing its corresponding notch. Accordingly, a length of floss can be captured in the opposing notches when the branches swing together. In the disclosed embodiment the notches are dimensioned to firmly grasp the captured section of floss.

The disclosed frame has a pair of rails extending from the claw-like structure at the distal end of the frame. One of the rails is pivotally connected to one end of a disclosed connector. The opposite end of this connector is pivotally connected to the underside of the articulating holder. In this embodiment, lifting the articulating holder causes the connector to reposition the frame more deeply into the housing. Lowering the articulating holder causes the connector to reposition the frame outwardly from the housing.

When the articulating holder is lifted, a user can withdraw an adequate amount of floss from the housing. The housing contains a spool of floss. In this embodiment, the spool has a pair of flanges on opposite ends of a spindle. The disclosed spool has along the border of its lower flange, a number of circumferentially spaced teeth forming between them a plurality of grooves.

The floss just dispensed is now routed through an inwardly facing notch on a stud projecting from one rail of the frame. Thereafter the floss is routed through the notches on the articulating holder's prongs. From there the floss is routed into an inwardly facing notch on a stud projecting from the other rail of the frame. Finally, after removing any slack, the floss is then wrapped around a hook-like device projecting from the side of the housing.

Next the articulating holder is lowered, and the frame is moves outwardly relative to the housing. This displaces a central stop located on a cross-piece at the inside (proximal) end of the frame. This displaced stop was previously located at the center of the spool away from the peripheral teeth. Upon its displacement, this central stop moves away from the center location and interlocks with teeth on the underside of the spool inside the housing. Because the spool is now locked, the floss can be pulled tight without deploying any more floss that would slacken the floss.

With the floss laid in the correct pattern, and the articulating holder lowered, the frame and the articulating holder move outwardly. Also, the overall length of the accessory increases. This motion increases the tension in the floss. Also, the articulating holder has an opposite pair of skirts, and when the articulating holder is lowered, the articulating holder's skirts are positioned to the outside of the studs on the two rails of the frame to shield most of the floss when the device is being used for dental cleaning.

Also, the lowering of the articulating holder lifts the floss in the articulating holder's prongs and places this stretch of floss into the notches of the two prongs on the frame.

The lowering of the articulating holder also moves cam surfaces on the two rails of the frame that interact with cam surfaces on an axially reciprocatable slider. The outer end of the slider supports a hook-like device that extends through the housing before the articulating holder is lowered. When the articulating holder is lowered, the camming surfaces cause the hook-like device to retract and locks in place the floss previously wrapped around the hook-like device.

The extension of the articulating holder and frame, together with the retraction of the hook-like device, will increase the tension in the floss. Since the floss spool is locked, the spool will not dispense any floss that might lessen the tension in the floss. In this embodiment, the retractable hook has a sharp blade that can be used to sever excess and possibly soiled floss, which is then discarded A user can now grip the accessory, and the floss can be inserted between adjacent teeth, and used in the usual manner.

BRIEF DESCRIPTION OF THE DRAWINGS

The above brief description as well as other objects, features and advantages of the present invention will be more fully appreciated by reference to the following detailed description of illustrative embodiments in accordance with the present invention when taken in conjunction with the accompanying drawings, wherein.

DETAILED DESCRIPTION

Referring to FIGS. 1, 2, 3, and 7, a floss accessory has a housing 10 with a lower base D and an upper hatch C. Hatch C is held in place by snapping onto tabs D1 and D2 of base D (an identical pair of tabs are located on the right and left sides of base D).

Figure 7:
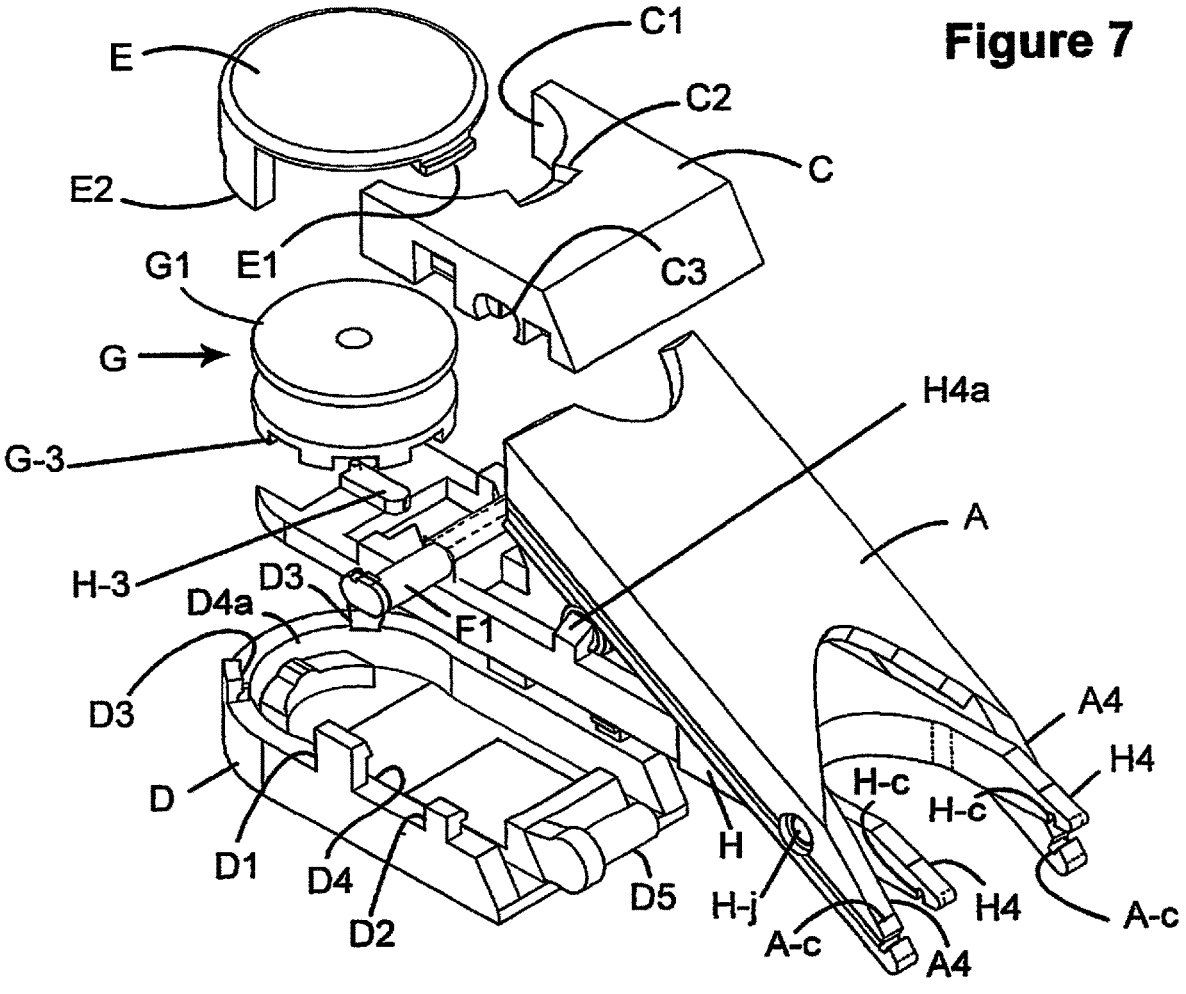
FIG. 7 is an exploded view of the accessory of FIG. 3.

The front face of hatch C is sloped. The back of hatch C has a circular wall C1 (FIG. 7). Spool cover E has a forward tab E1 that fits into notch C2 on hatch C. Back wall E2 of cover E snaps onto tabs D3 (FIG. 7) that project upwardly from the upper edge of base D.

Figure 6:
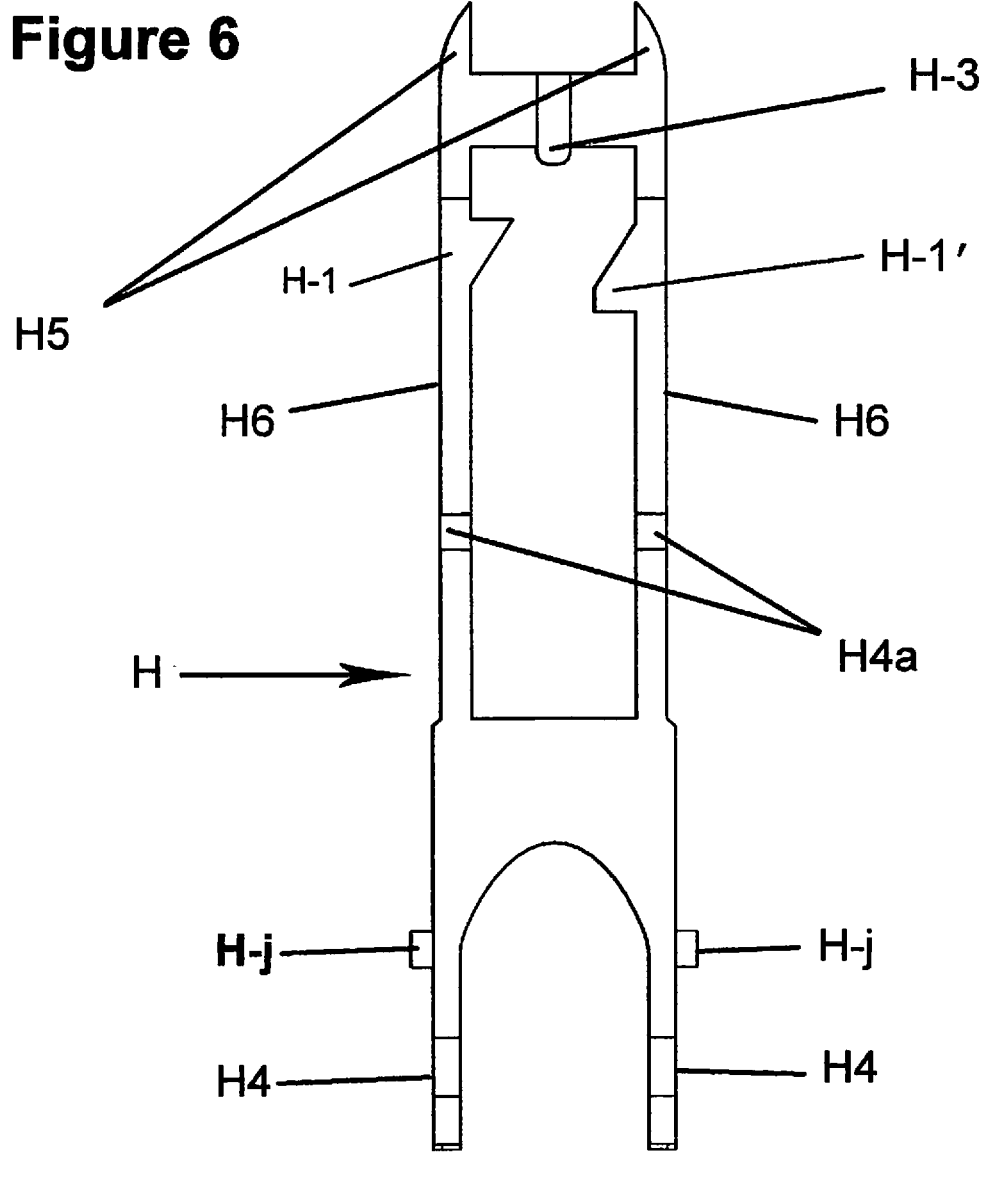
FIG. 6 is a top plan view of the frame of FIG. 2, shown removed from the accessory of FIG. 2.

Base D has an internal wall with parallel sections D4 (FIG. 7) running from the front and terminating in a curved section D4a. Frame H has rails H6 (FIG. 6) that are slidably mounted between walls D4 (FIG. 7) of base D. Frame H also has an upright pair of internal studs H4a (FIGS. 2, 3, and 7) with grooves on their inside faces to hold a section of floss away from the user's hands when the accessory is being used as a dental cleaning device.

The exposed (distal) end of frame H has a claw-like structure comprising a pair of prongs H4. The tips of prongs H4 each have on their underside a downwardly facing notch H-c.

Articulating holder A is pivotally mounted on stud H-j. This pivot is located about one-quarter of the way up from the distal tip of holder A. The exposed (distal) end of articulating holder A has a claw-like structure comprising a pair of prongs A4. The tips of prongs A4 each have on their topside an upwardly facing notch A-c.

Figure 2:
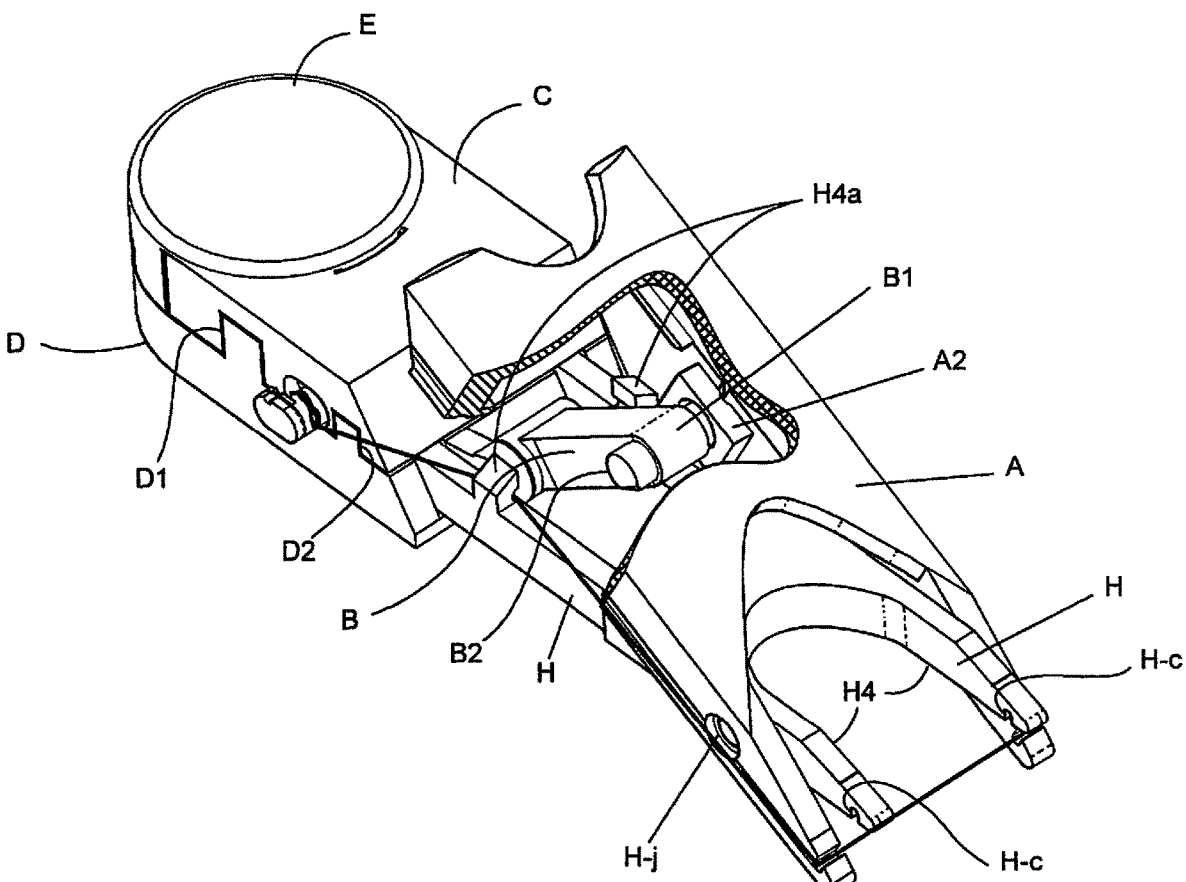
FIG. 2 is perspective view of the accessory of FIG. 1 with the articulating holder lifted and a portion thereof broken away to reveal some of the underlying structure.

A pair of plates A2 project from the underside of articulating holder A (only one plate being visible in FIG. 2). The upper end of connector B has an integral axle B2 that is journaled between the plates A2. The lower end of connector B is pivotally mounted on the axle D5 of base D (FIG. 7).

Figures 12A, 12B:
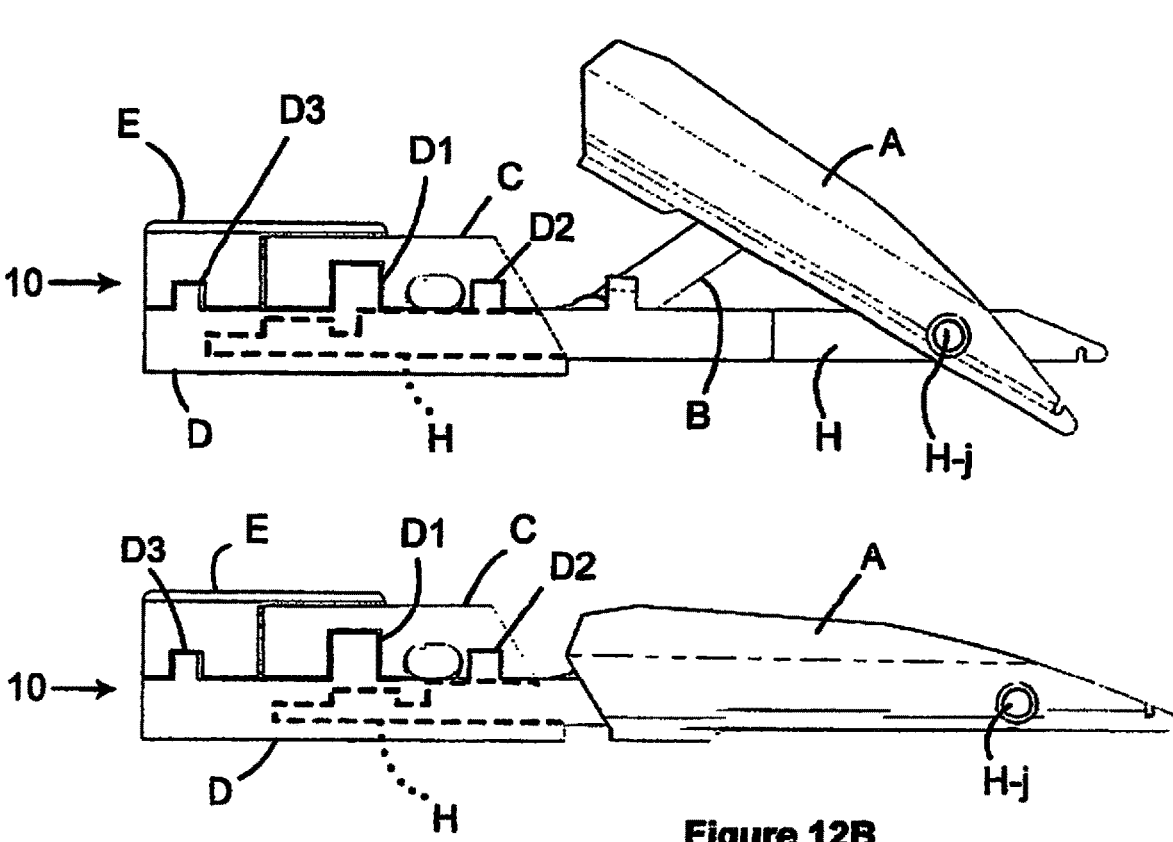
FIG. 12A is a side elevational view of the accessory of FIG. 3, showing the articulating holder lifted.
FIG. 12B is a side elevational view of the accessory of FIG. 3, showing the articulating holder lowered.

Lifting articulating holder A as shown in FIG. 12A changes the relative positions of housing 10 and frame H and effectively moves the proximal end of frame H more deeply into housing 10. Lowering articulating holder A as shown in FIG. 12B reverses the foregoing and effectively pulls the proximal end of frame H in an outward direction relative to housing 10. A comparison of FIGS. 12A and 12B shows that in the configuration of FIG. 12B the overall length of the accessory is greater, and, in particular, the distal tips of elements A and H are further away from housing 10. As explained further hereinafter, this change in length will be useful in enhancing the tension in the floss being handled by the accessory. In this embodiment the length increases by about 1 cm, although this increase can be different in other embodiments, depending upon the size of the accessory, the desired tension in the floss, etc.

Figures 13A, 13B:
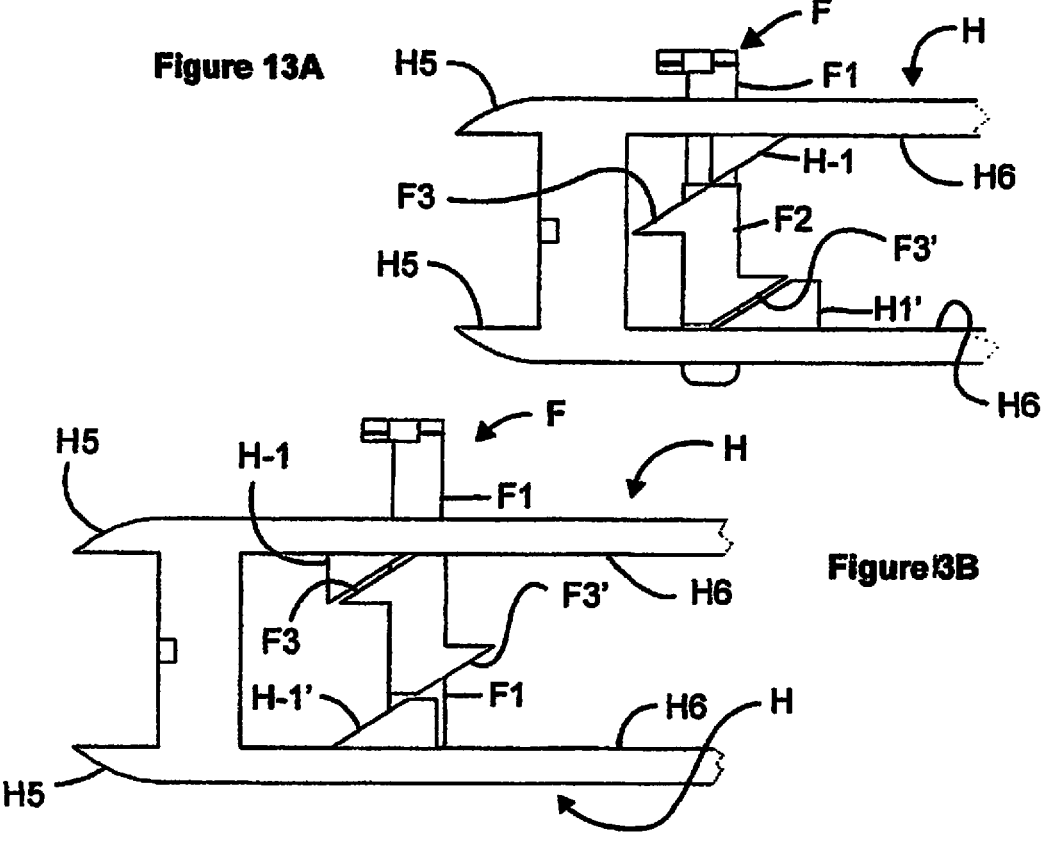
FIG. 13A is a lower plan view of the proximal end of the frame and camming mechanism, and showing the frame withdrawn to retract the end of the hook device.
FIG. 13B is a lower plan view of the proximal end of the frame and camming mechanism, and showing the frame deployed to extend the end of the hook device.

This displacement of frame H is shown in FIGS. 13A and 13B. Camming elements H-1 and H-1' are integrally mounted on the inside faces of rails H6 and interact with camming surfaces F3 and F3' on device F2. Camming device F2 is attached to the underside of slider F1. Slider F1 is slidably mounted in tunnel C3 on the underside of hatch C (See FIG. 7), In FIG. 13A slider F1 retracts when frame H is withdrawn, i.e., when articulating holder A is folded down and cam surfaces H-1 and H-1' retract slider F1. In FIG. 13B slider F1 is extended when frame H is moved inwardly, i.e., when the articulating holder A is lifted up and cam surfaces H-1 and H-1' ride along camming surfaces F3 and F3' to drive slider F1 outwardly. In FIG. 13B proximal tips H5 eventually reach wall D4a (FIG. 7) and are stopped thereby, Referring to FIG. 4, the distal end of slider F1 supports a two-part oval piece K. Sandwiched between the two parts of piece K is a metal blade K2, shown projecting through notch K1. Blade K2 can be used to sever excess floss that is soiled or otherwise unnecessary. It will be appreciated that a severing device can be mounted at other locations of the accessory.

Figure 8:
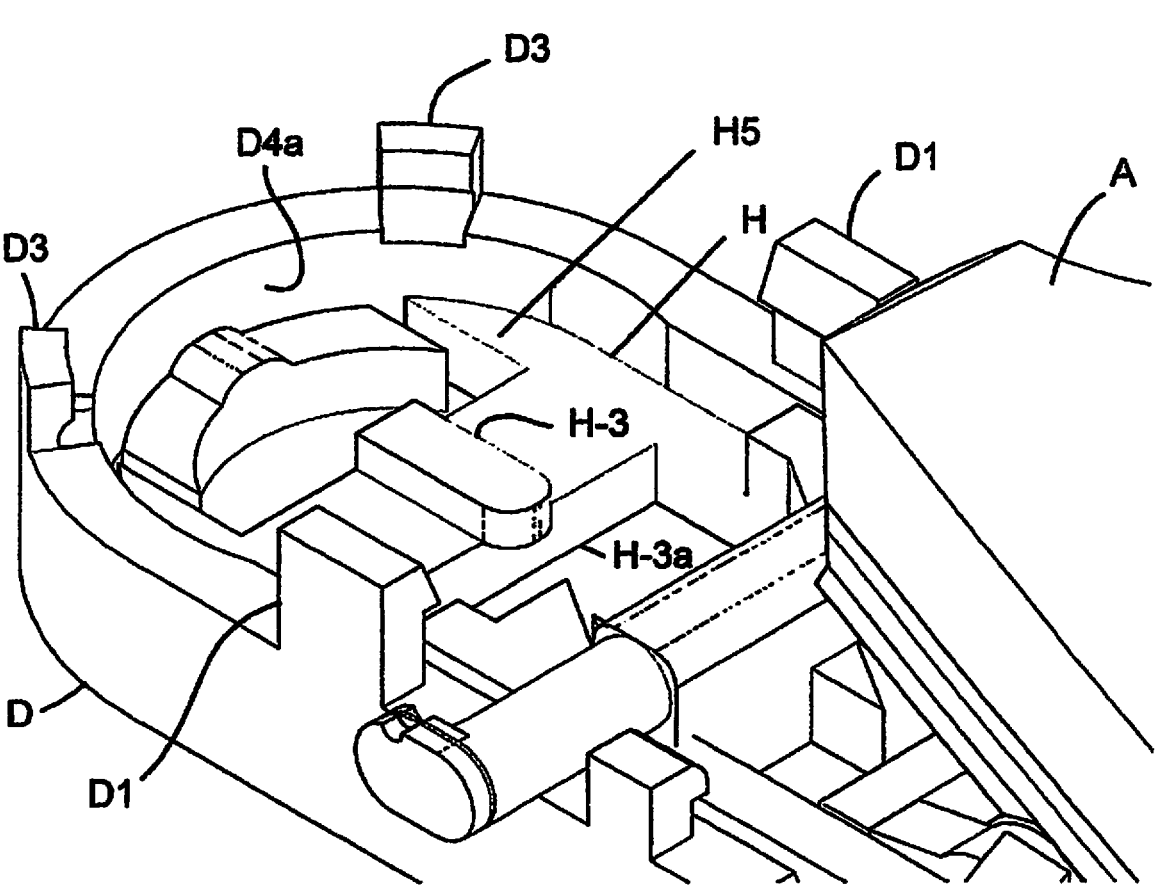
FIG. 8 is a detailed perspective view of a proximal portion of the housing of FIG. 7 with the upper structure removed and the frame fully extended into the housing.
Figure 9:
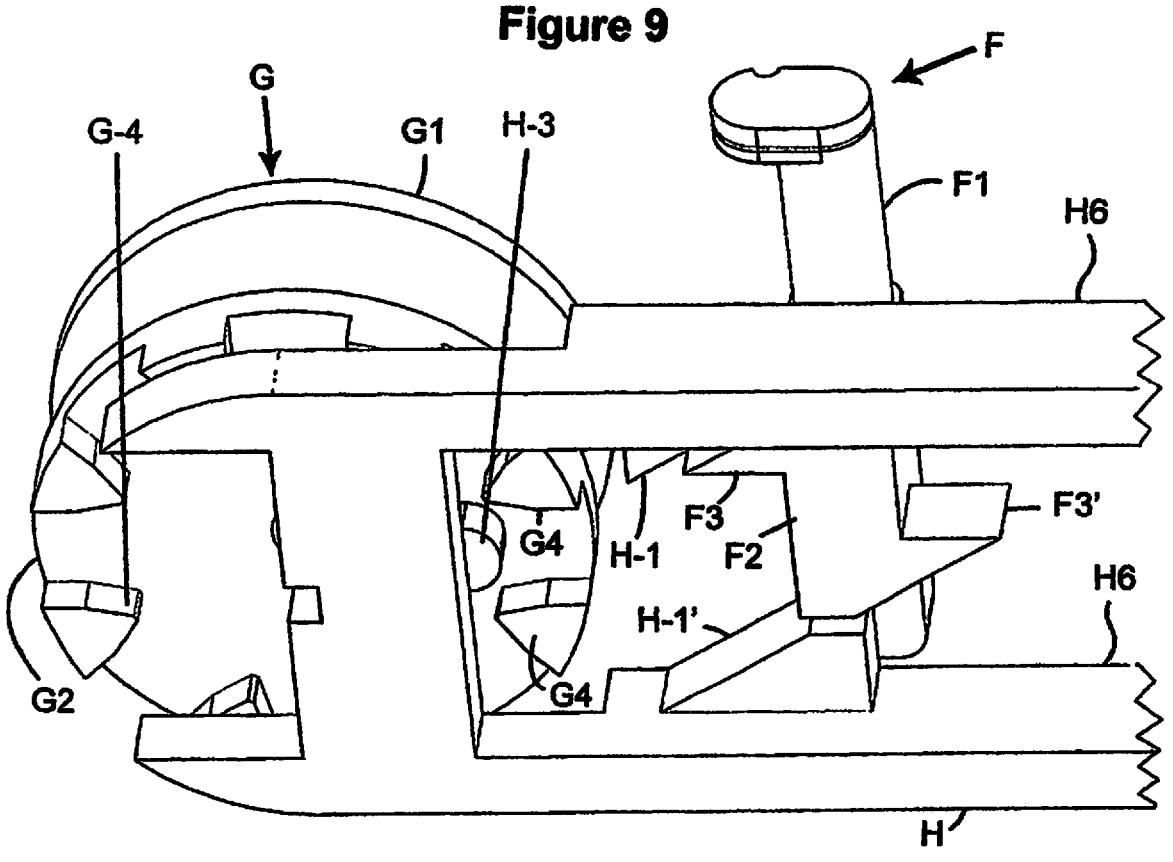
FIG. 9 is a perspective view of underside of the frame of FIG. 7 with the spool and the reciprocating slider mounted atop the frame.
Figure 10:
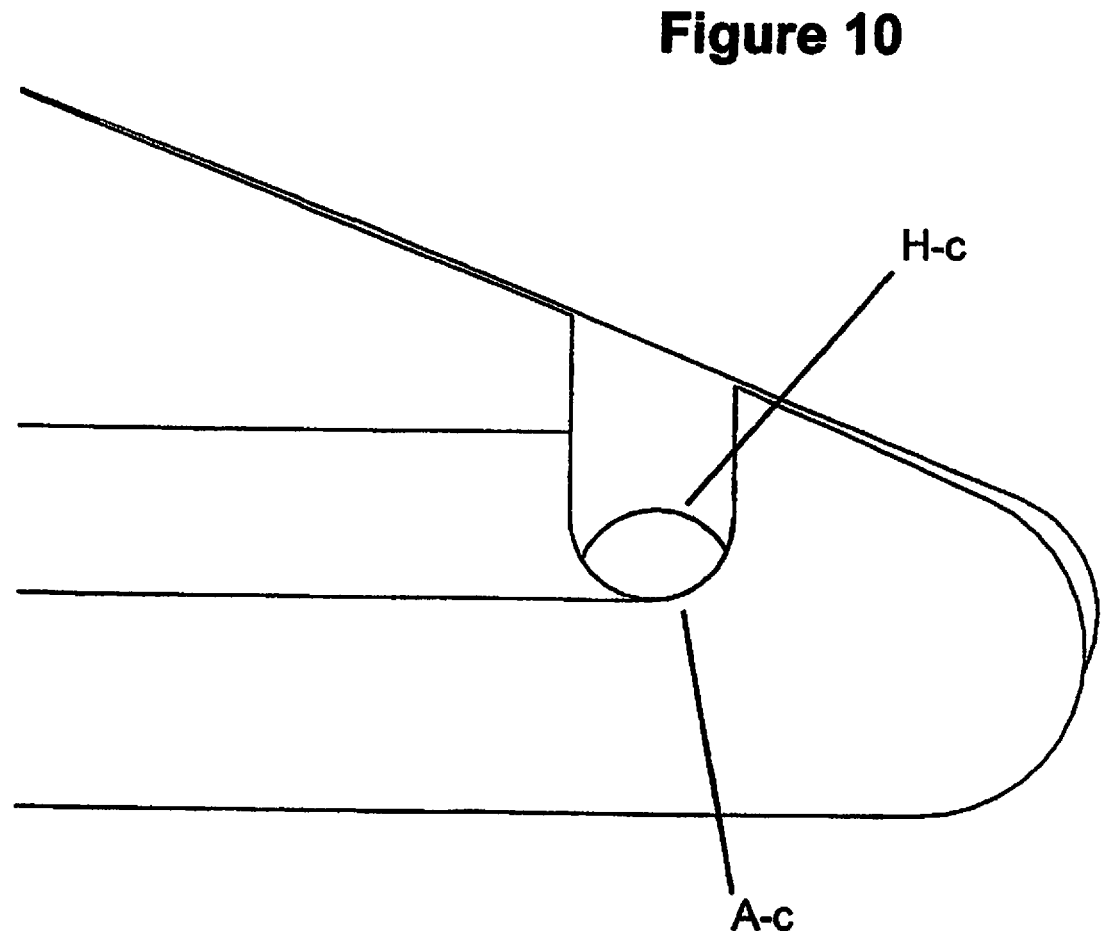
FIG. 10 is a detailed elevational view of the distal ends of a corresponding pair of the prongs of the articulating holder and frame of FIG. 1.
Figure 11:
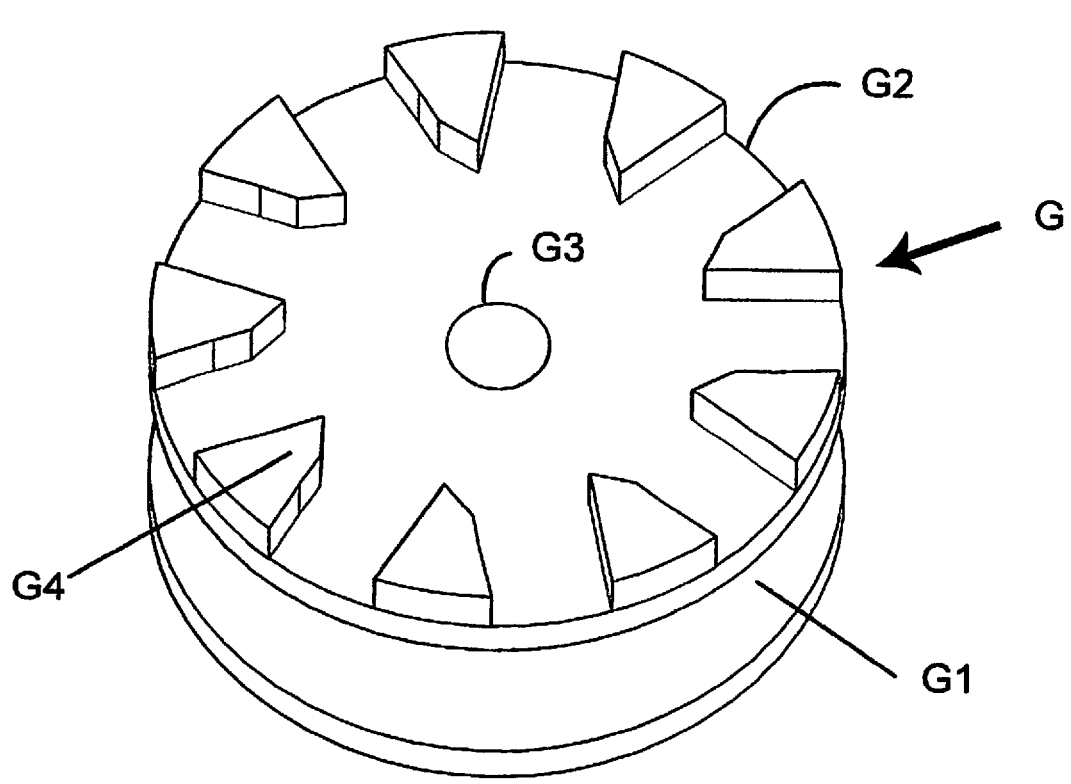
FIG. 11 is a detailed perspective view of the underside of the spool of FIG. 7.

Referring to FIGS. 8, 9, and 11, spool G has an upper flange G1 and lower flange G2 mounted on a spindle G3. Lower flange G2 has nine equiangularly spaced teeth G4 forming between them nine grooves. It will be appreciated that a different number of teeth may be employed in different embodiments.

The inner end of frame H has a stop H-3 mounted on cross-piece H-3*a*. The spool's lower flange G2 will lay upon the inner end of frame H and stop H-3. In the position illustrated in FIG. 8, stop H-3 is in its deepest position inside base D. In this position stop H-3 lies in the center of flange G2, is spaced from the teeth G4, and will not interact with these teeth.

When frame H is withdrawn due to the lowering of articulating holder A (see for example, FIG. 9), stop H-3 is thrust between an adjacent pair of the teeth G4. The inside tips of teeth G4 are beveled to shift teeth G4 as needed so that stop H-3 smoothly enters between the teeth G4. Once stop H-3 is lodged between an adjacent pair of teeth G4, spool G is locked and will not rotate and will not dispense floss wound on the spool.

To facilitate an understanding of the principles associated with the foregoing apparatus, its operation will be briefly described. Floss can be wound on spool G between the flanges G1 and G2 before installing it under cover E. A short length of floss is unwound from the spool and routed between cover E and hatch C as the cover E is reattached to base D. The space between cover E and hatch C is wide enough to allow the user to pull on the loose end of the floss and deploy additional floss (all assuming articulating holder A is lifted as shown in FIG. 12A).

Figure 3:
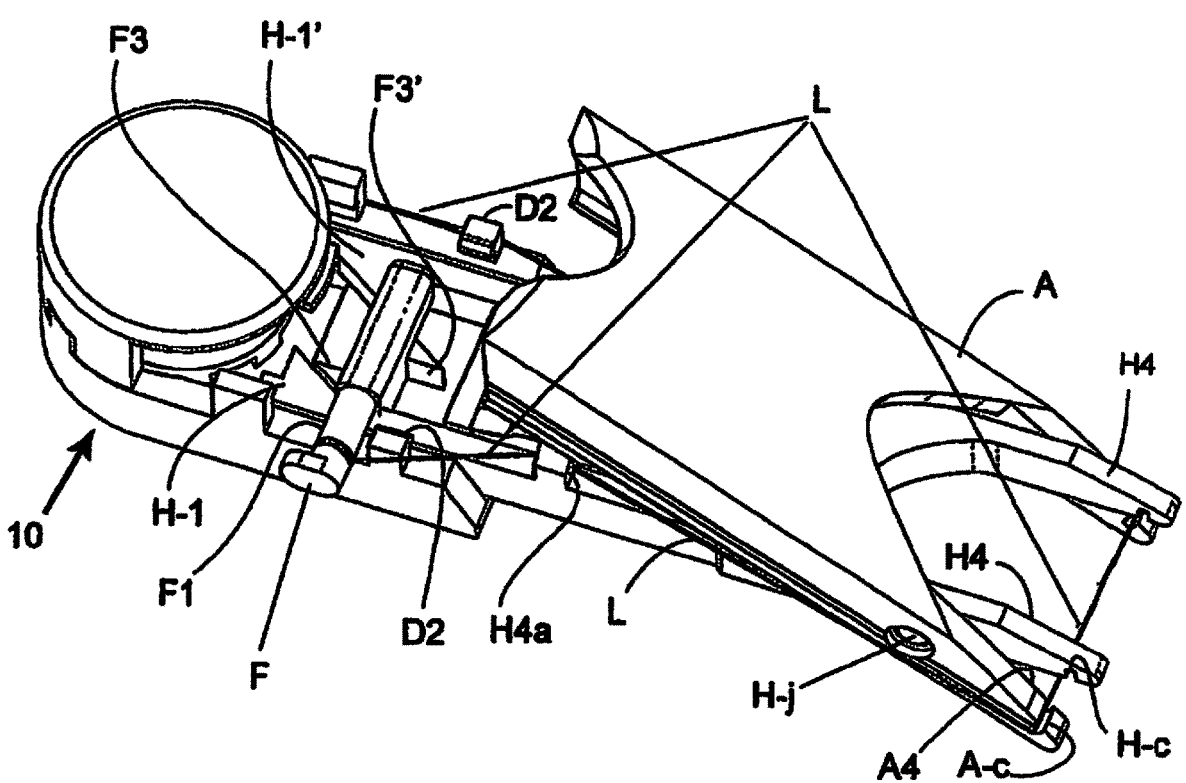
FIG. 3 is perspective view of the accessory of FIG. 1 with the articulating holder lifted and a portion of the housing removed to show the underlying structure.
Figure 4:
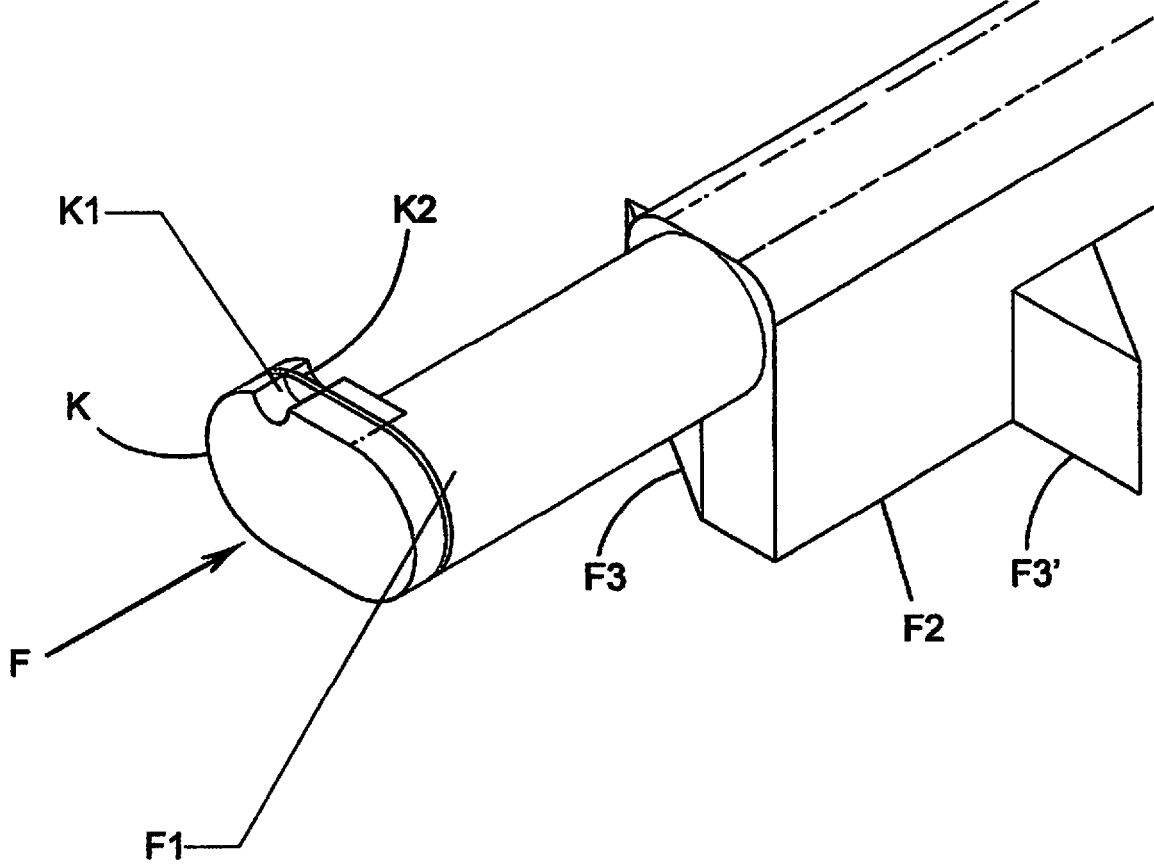
FIG. 4 is a perspective view of the distal end of the hook device of FIG. 3.
Figure 5:
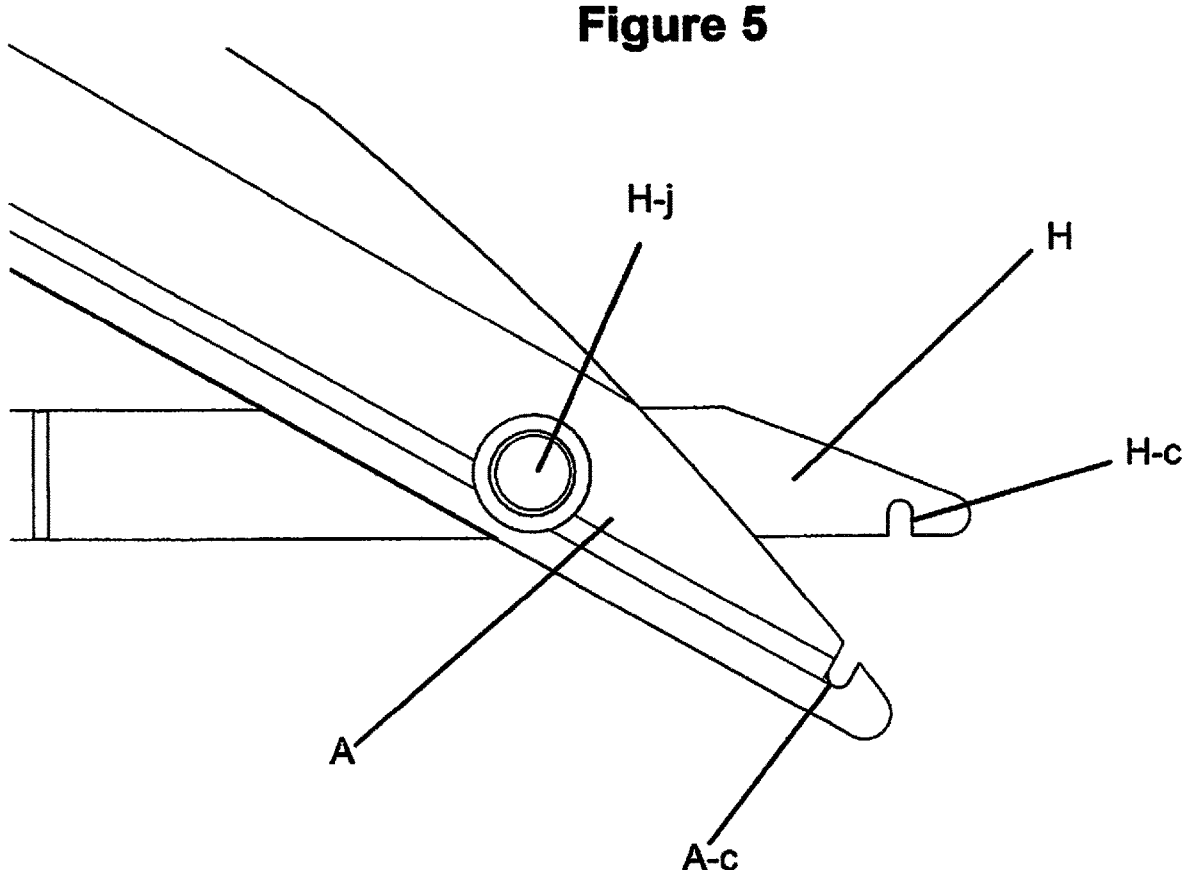
FIG. 5 is a side view of distal ends of the articulating holder and frame of FIG. 2.

With articulating holder A lifted to the position shown in FIG. 3, floss L may be pulled from housing 10. It will be understood that hatch C is installed on base D at this time (see FIG. 2). Thereafter floss L is routed under articulating holder A then through the inside notches on studs H4*a* on frame H (see FIGS. 2 and 3). Next floss L is routed through the two notches A-c at the ends of prongs A4. From there, the floss L is routed through the notch on the inside of stud H4*a* on frame H. After removing any slack in floss L, the free end of floss L is wound around slider F1. Excess floss L can be severed at his time using blade K2 (FIG. 4).

Figure 1:
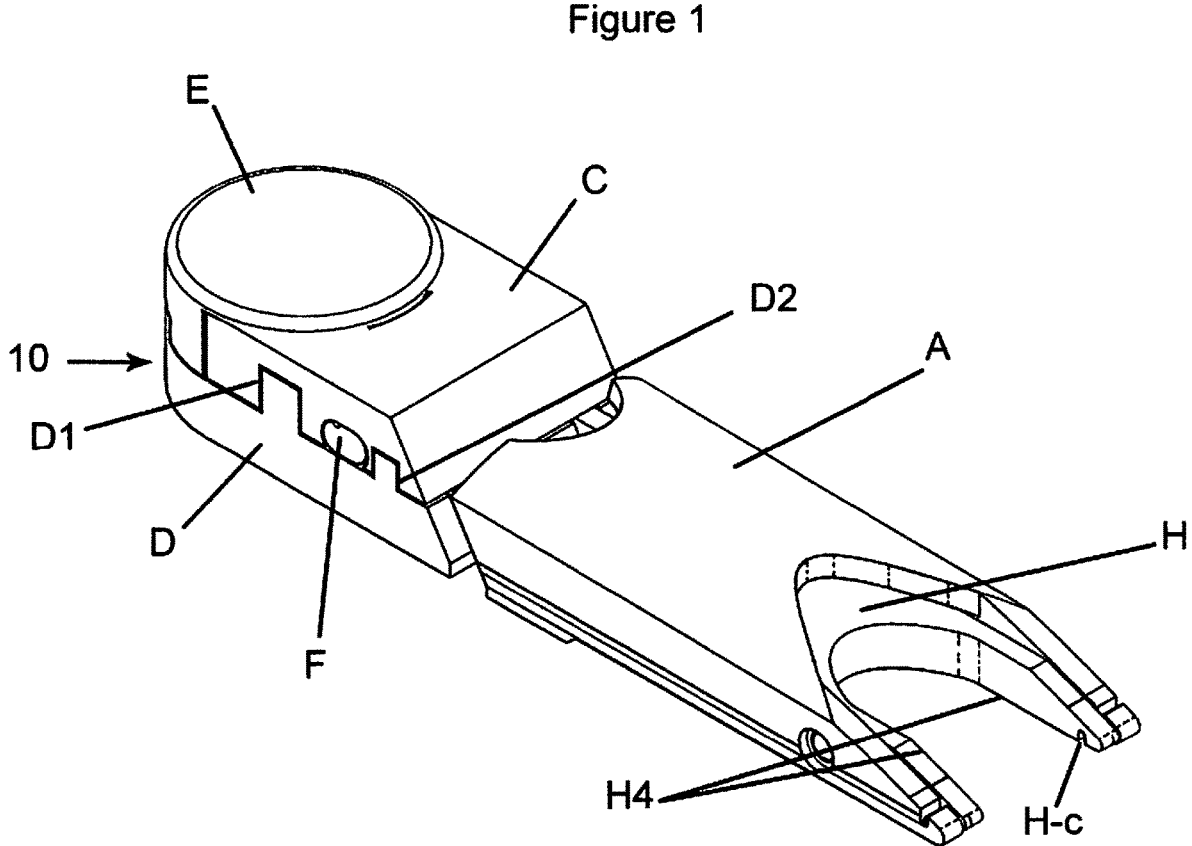
FIG. 1 is a perspective view of a floss accessory in accordance with principles of the present invention.

Next, articulating holder A is lowered to the position shown in FIG. 1, wherein floss L is safely stored behind studs H4*a*. Four things now happen simultaneously. Prongs A4 lift floss L in notches A-c and deposit the floss securely in notches H-c at the end of prongs H4. At the same time, connector B (FIG. 2) repositions frame H outwardly to bring stop H-3 between an adjacent pair of teeth G-4 (the beveled inner tips of teeth G-4 move the teeth to facilitate tooth insertion). The foregoing prevents rotation of spool G. Next, the accessory lengthens as shown in FIGS. 12A and 12B. Finally, the retraction of frame H moves frame H from the position of FIG. 13B to the position of FIG. 13A. As previously described, hook-like device F retracts into housing 10.

All of these steps prepare the accessory for use as a dental cleaning device. The lengthening of the accessory increases tension in floss L, while the locking of spool G prevents deployment of additional floss that would reduce tension. The locking of floss L between notches A-c and H-c, prevents slackening of floss L, as does the locking of floss L around the retracted hook-like device F.

Now the accessory can be used in the usual fashion. The user can hold the accessory by grasping one or more of housing 10, hatch C, and elements A and H. The section of floss between prongs H4 and A4 can be inserted between an adjacent pair of teeth and reciprocated in and out, and up and down, to clean the interdental spaces. The user can move floss L to the next pair of adjacent teeth, and so forth.

When the user has finished flossing all teeth, floss L can remain in the accessory. Alternatively, the articulating holder A can lifted and a length of floss L dispensed so that the used floss reaches blade K2 (FIG. 4) where the used floss L can be severed and discarded.

It is appreciated that various modifications may be implemented with respect to the above described embodiments. While a spool with lower teeth is disclosed, in some embodiments the spool teeth can be on the upper surface. Alternatively, teeth may be disposed on the edge of a spool, and ratchet teeth will allow rotation in only one direction. Also, instead of a connector for longitudinally shifting a frame, the frame can be driven by a sprocket with teeth that are rotated to shift the frame. Also, instead of simultaneously executing all four steps in response to the lowering of the articulating holder, fewer than all the steps may be executed when the articulating holder is lowered. In some embodiments the spool can be stored in a forward location and the floss L can be routed accordingly.

Obviously, many modifications and variations of the present invention are possible in light of the above teachings. It is therefore to be understood that within the scope of the appended claims, the invention may be practiced otherwise than as specifically described.

The invention claimed is:

1. A floss accessory for dispensing floss, the floss accessory comprising:
   a housing for holding a supply of the floss; and
   a holding assembly operable to grasp a portion of the floss, the holding assembly having a first and a second holder each having a pair of prongs with distal ends, the first holder being pivotally attached to the second holder along a pivot axis, the second holder being slidably mounted in the housing, the first holder pivotally mounted to swing to a gripping position, the distal ends of the pair of prongs of the first holder having primary notches, the distal ends of the pair of prongs of the second holder having secondary notches, the primary notches opening in a direction facing toward the secondary notches, the secondary notches opening in a direction facing toward the primary notches, and the holding assembly being operable to bring the primary notches and the secondary notches into alignment in order to grasp a portion of the floss; and
   a slider mounted to slide transversely in the housing between an extended winding position and a retracted position in response to repositioning of the second holder in the housing.

2. The floss accessory according to claim 1, comprising: a linkage between the first and the second holder that is operable to reposition the second holder inwardly in the housing in response to rotation about the pivot axis that increases angular displacement between the first and the second holder.

3. The floss accessory according to claim 2, wherein the linkage is operable to reposition the second holder outwardly in the housing in response to rotation about the pivot axis that decreases the angular displacement between the first and the second holder, outward repositioning of the second holder causing outward repositioning of the pivot axis and the first holder.

4. The floss accessory according to claim 3, wherein the linkage comprises a connector journaled on the first holder and on the second holder and spaced from the pivot axis.

5. The floss accessory according to claim 4, comprising a spool of floss stored in the housing.

6. The floss accessory according to claim 5, wherein the spool of floss is rotatable and is positioned above a proximal end of the second holder.

7. The floss accessory according to claim 6, wherein the spool of floss has a flange with a plurality of spool teeth on the-an outside of the flange, the plurality of spool teeth having sloped inner tips.

8. The floss accessory according to claim 7, wherein the housing comprises:

a base; and a hatch mounted upon the base.

9. The floss accessory according to claim 7, wherein the housing comprises:

a removable spool cover on the housing to allow access to and replacement of the spool.

10. The floss accessory according to claim 7, wherein the second holder has a stop sized to intervene between an adjacent pair of the plurality of spool teeth upon the second holder being outwardly repositioned in the housing in response to decreasing the angular displacement between the first and the second holder, the stop being operable to retract from the plurality of spool teeth upon the second holder being inwardly repositioned in the housing in response to increasing the angular displacement between the first and the second holder.

11. The floss accessory according to claim 1, wherein the second holder has a one or more camming surfaces oriented to engage the slider and move it outwardly upon the second holder being inwardly repositioned in the housing in response to increasing angular displacement between the first and the second holder, the one or more camming surfaces being operable to engage the slider and reposition it inwardly upon the second holder being outwardly repositioned in the housing in response to decreasing the angular displacement between the first and the second holder.

12. The floss accessory according to claim 1, wherein the slider comprises:

a floss cutter on a distal end of the slider.

13. The floss accessory according to claim 1, wherein the second holder has on opposite sides a pair of internal studs with grooves for recessing and guiding the floss.

14. The floss accessory according to claim 1, wherein the holding assembly has a screw mechanism that is rotated in response to changing angular displacement, the screw mechanism engaging the slider and being operable to reciprocate the slider.

15. A floss accessory for dispensing floss comprising:

a housing for holding a supply of the floss; and a holding assembly operable to grasp a portion of the floss, the holding assembly having a first and a second holder with an angularly adjustable separation, each of the holders having a pair of prongs with distal ends formed with notches, the notches of the first holder being oriented opposite the notches of the second holder and the distal ends of the first holder remaining laterally separated from the distal ends of the second holder when the floss is grasped by each of the prongs;

wherein angular movement of the first holder towards the second holder shifts the opposing notches past one another by at least a predetermined distance to increase tension in the floss;

wherein the first holder is pivotally mounted to swing about a pair of opposing pivot points to a gripping position; and wherein the holding assembly is operable: (a) to increase the assembly length in response to rotation that decreases angular displacement between the first and the second holder, and (b) to decrease the assembly length in response to rotation that increases the angular displacement between the first and the second holder.

16. The floss accessory for dispensing floss of claim 15, wherein a lateral distance between the first holder pair of prongs is greater than a lateral distance between the second holder pair of prongs.

17. A floss accessory for dispensing floss comprising:

a housing for holding a spool of floss;

an articulating holder comprising a pair of prongs with upward-facing notches, angularly adjustable between raised and lowered positions to grasp the floss;

a sliding holder angularly separable from the articulating holder and comprising a pair of prongs disposed between the articulating holder prongs, the sliding holder prongs having downward-facing notches for receiving the floss when the articulating holder is in the lowered position;

a slider mounted to slide transversely in the housing, the slider adapted to move to an extended position in response to movement of the articulating holder to the raised position to enable release and disposal of used portions of the floss; and wherein when the articulating holder is moved from the raised position to the lowered position, the slider retracts toward an inside of the housing in order to increase tension in the floss.

18. The floss accessory for dispensing floss of claim 17, wherein when the articulating holder is moved from the raised position to the lowered position, the sliding holder slides within the housing to block deployment of floss from the spool of floss and increase spacing between the spool of floss in the housing to each of the prongs in order to increase tension in the floss.

* * * * *